W. S. Smith,
Water Wheel,
Nº 12,606.                    Patented Mar. 27, 1855.
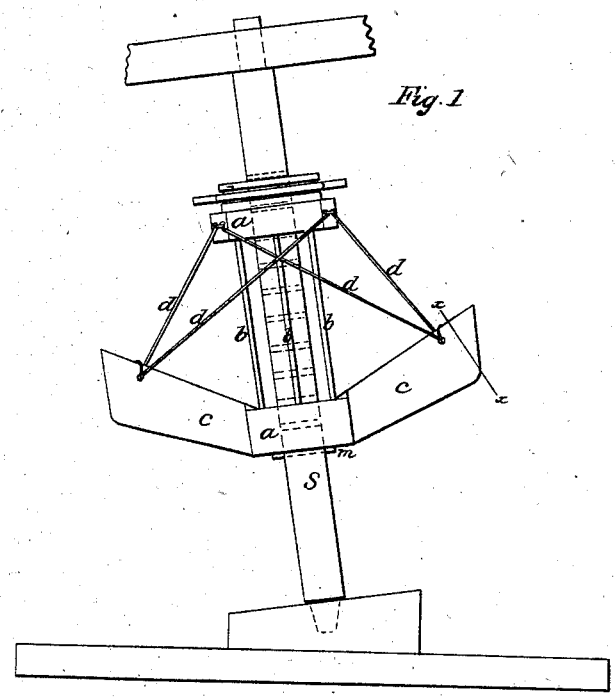
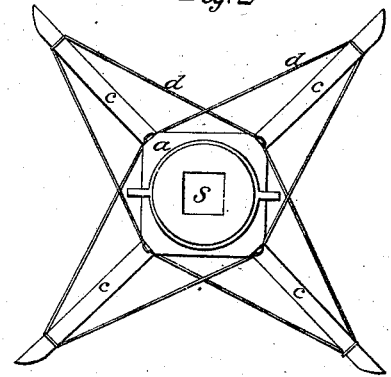

UNITED STATES PATENT OFFICE.

WILLIAM S. SMITH, OF CEDAR RAPIDS, IOWA.

CURRENT-WHEEL.

Specification of Letters Patent No. 12,606, dated March 27, 1855.

*To all whom it may concern:*

Be it known that I, WILLIAM S. SMITH, of Cedar Rapids, in the county of Linn and State of Iowa, have invented a new and useful Improvement in Current-Wheels; and I do hereby declare that the following is a full, clear, and exact description of the construction and operation of the same, reference being had to the annexed drawing, forming part of this specification, in which—

Figure 1 is an elevation of the wheel and shaft. Fig. 2 is a top view of wheel and shaft. Fig. 3 is a cross section of paddle, on line $x$ $x$.

Similar characters of reference in the several figures denote the same part of the wheel.

The nature of my invention consists in making the head or hub to which the blades or paddles are secured, movable on the shaft of the wheel for graduating its position in the water and for furnishing a simple and convenient mode of stopping its rotation.

To enable others skilled in the art to make and use my invention I will proceed to describe it.

In the drawing $a$ is the head composed of two parts united by bolts $b$. In the lower portion of the head or hub $a$, the blades or paddles $c$ are secured, strengthened by braces $d$ running from the upper portion of the hub. This head or hub $a$ is movable on the shaft S so as to be capable of elevation by lever attached to it.

The shaft S inclines outward from the bank so as to bring the paddles nearly horizontal when they reach the water; the depth to which they are permitted to descend being regulated by means of the sliding hub $a$: the hub being maintained at any desired position on the shaft by a pin or bolt $m$ inserted through the shaft and under the hub. If it be desired to stop the rotation of the wheel, power is applied to the lever connected with the hub and the wheel lifted from the water.

What I claim as my invention and desire to secure by Letters Patent, is—

The construction of current wheels with heads or hubs movable on the shaft as and for the purposes herein before set forth.

In testimony whereof, I have hereunto signed my name before two subscribing witnesses.

WILLIAM S. SMITH.

Witnesses:
W. W. HIGLEY,
FREEMAN SMITH.